US012001701B2

(12) United States Patent
Muthiah

(10) Patent No.: US 12,001,701 B2
(45) Date of Patent: Jun. 4, 2024

(54) STORAGE BIASING FOR SOLID STATE DRIVE ACCELERATORS

(71) Applicant: Western Digital Technologies, Inc., San Jose, CA (US)

(72) Inventor: Ramanathan Muthiah, Bangalore (IN)

(73) Assignee: Western Digital Technologies, Inc., San Jose, CA (US)

( * ) Notice: Subject to any disclaimer, the term of this patent is extended or adjusted under 35 U.S.C. 154(b) by 80 days.

(21) Appl. No.: 17/585,410

(22) Filed: Jan. 26, 2022

(65) Prior Publication Data

US 2023/0236750 A1 Jul. 27, 2023

(51) Int. Cl.
 *G06F 3/06* (2006.01)
(52) U.S. Cl.
 CPC ............ *G06F 3/064* (2013.01); *G06F 3/0613* (2013.01); *G06F 3/0659* (2013.01); *G06F 3/0688* (2013.01)
(58) Field of Classification Search
 None
 See application file for complete search history.

(56) References Cited

U.S. PATENT DOCUMENTS

| 8,385,632 | B2 | 2/2013 | Porikli |
| 2016/0078359 | A1 | 3/2016 | Csurka et al. |
| 2016/0253597 | A1 | 9/2016 | Bhatt et al. |
| 2017/0140253 | A1 | 5/2017 | Wshah et al. |
| 2018/0285290 | A1* | 10/2018 | Luan ............... G06F 13/4022 |
| 2019/0370073 | A1* | 12/2019 | Behar .............. G06F 3/0673 |

\* cited by examiner

*Primary Examiner* — Michael Alsip
(74) *Attorney, Agent, or Firm* — Rutan & Tucker LLP; Hani Z. Sayed; Ravi Mohan

(57) ABSTRACT

In response to the problems and scenarios described above, Solid State Drive (SSD) devices with hardware accelerators and methods for apportioning storage resources in the SSD are disclosed. SSDs typically comprise an array of non-volatile memory devices and a controller which manages access to the memory devices. The controller may also comprise one or more accelerators to either improve the performance of the SSD itself or to offload specialized computation workloads of a host-computing device. Different accelerators may be dynamically assigned portions of the non-volatile memory array according to the type of data being accessed and/or the throughput required. Provision is also made for the data to be accessed directly by the accelerators bypassing the controller.

15 Claims, 8 Drawing Sheets

STORAGE BIASING FOR SOLID STATE DRIVE ACCELERATORS

FIELD OF THE INVENTION

The present disclosure relates to Solid State Drive (SSD) devices. More particularly, the present disclosure relates to efficiently allocating memory for accelerators in SSD devices.

BACKGROUND

In recent years, there has been a trend towards hardware acceleration in various aspects of computation. Accelerators are typically processors that have been specially optimized to perform specific functions or computations. For example, many Central Processing Units (CPUs) contain a plurality of processor cores optimized for general-purpose computing, one or more Graphics Processing Units (GPUs) that are specialized for processing image data, encryption processors to secure data transmitted or received over networks, and the like.

Similarly, there has been a trend to process ever-increasing quantities and types of data, each with its own computational needs. Some types of data are simply massive and require fast access random access like, for example, running sorts and queries on very large databases. Other data types are large and have regularities that can be exploited by organizing the data in a particular way, like, for example, processing hundreds of hours of video data stored in a surveillance video camera or accessing model coefficients from memory in a machine learning application. Since all of these data applications require mass storage at some point in their lifetimes, placing accelerators and enough non-volatile memory for storing large data sets internal to SSDs to offload some of the computational workload of the host on these data structures may be highly desirable.

BRIEF DESCRIPTION OF DRAWINGS

The above and other aspects, features, and advantages of several embodiments of the present disclosure will be more apparent from the following description is presented in conjunction with the following several figures of the drawings.

DETAILED DESCRIPTION

Figure 1:
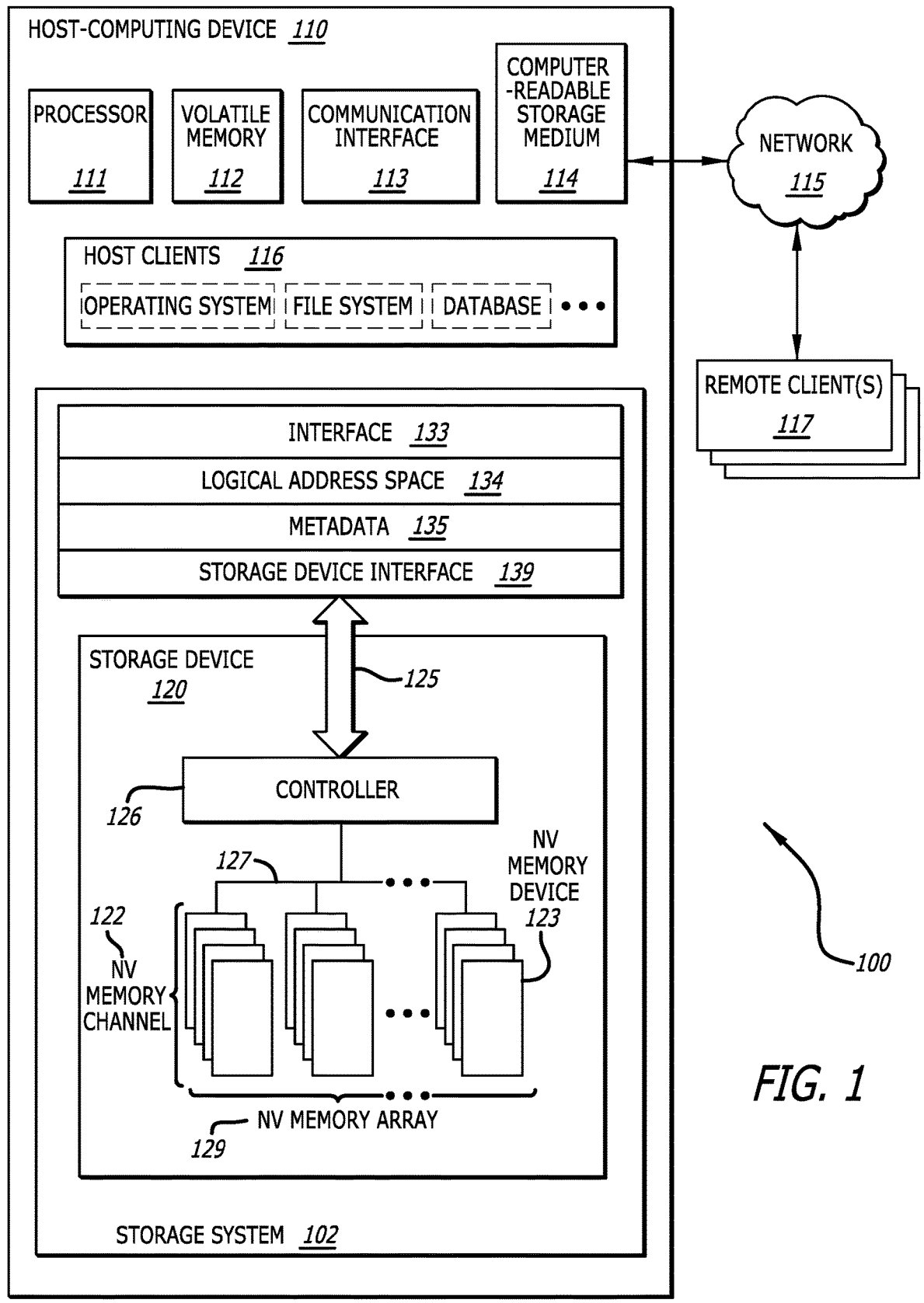
FIG. 1 is a schematic block diagram of a system in accordance with an embodiment of the disclosure.

In response to the problems and scenarios described above, Solid State Drive (SSD) devices with accelerators and methods for apportioning storage resources as caches for those accelerators in the SSD are disclosed. SSDs typically comprise an array of non-volatile memory devices (usually NAND flash integrated circuits) and a controller which manages access to the memory devices. SSDs of the disclosure may also comprise one or more accelerators to either improve the performance of the SSD itself or to offload specialized computation workloads of a host-computing device. Different accelerators may be dynamically assigned portions of the nonvolatile memory array for caching data sets according to the type of data being accessed and/or the throughput required. Provision is also made for the data to be accessed directly by the accelerators bypassing the controller (typically a System on a Chip [SoC] itself comprising one or more processors along with other necessary hardware). The accelerators may also be present on the SoC and operate in parallel with other controller processors or may be located elsewhere in the SSD or the larger system.

Aspects of the present disclosure may be embodied as an apparatus, system, method, or computer program product. Accordingly, aspects of the present disclosure may take the form of an entirely hardware embodiment, an entirely software embodiment (including firmware, resident software, micro-code, or the like) or an embodiment combining software and hardware aspects that may all generally be referred to herein as a "function," "module," "apparatus," or "system." Furthermore, aspects of the present disclosure may take the form of a computer program product embodied in one or more non-transitory computer-readable storage media storing computer-readable and/or executable program code. Many of the functional units described in this specification have been labeled as functions, in order to emphasize their implementation independence more particularly. For example, a function may be implemented as a hardware circuit comprising custom VLSI circuits or gate arrays, off-the-shelf semiconductors such as logic chips, transistors, or other discrete components. A function may also be implemented in programmable hardware devices such as via field programmable gate arrays, programmable array logic, programmable logic devices, or the like.

Functions may also be implemented at least partially in software for execution by various types of processors. An identified function of executable code may, for instance, comprise one or more physical or logical blocks of computer instructions that may, for instance, be organized as an object, procedure, or function. Nevertheless, the executables of an identified function need not be physically located together but may comprise disparate instructions stored in different locations which, when joined logically together, comprise the function and achieve the stated purpose for the function.

Indeed, a function of executable code may include a single instruction, or many instructions, and may even be distributed over several different code segments, among different programs, across several storage devices, or the like. Where a function or portions of a function are implemented in software, the software portions may be stored on one or more computer-readable and/or executable storage media. Any combination of one or more computer-readable storage media may be utilized. A computer-readable storage medium may include, for example, but not limited to, an electronic, magnetic, optical, electromagnetic, infrared, or semiconductor system, apparatus, or device, or any suitable combination of the foregoing, but would not include propagating signals. In the context of this document, a computer readable and/or executable storage medium may be any tangible and/or non-transitory medium that may contain or store a program for use by or in connection with an instruction execution system, apparatus, processor, or device.

Computer program code for carrying out operations for aspects of the present disclosure may be written in any combination of one or more programming languages, including an object-oriented programming language such as Python, Java, Smalltalk, C++, C #, Objective C, or the like, conventional procedural programming languages, such as the "C" programming language, scripting programming languages, assembly languages, and/or other similar programming languages. The program code may execute partly or entirely on one or more of a user's computer and/or on a remote computer or server over a data network or the like.

A component, as used herein, comprises a tangible, physical, non-transitory device. For example, a component may be implemented as a hardware logic circuit comprising custom VLSI circuits, gate arrays, or other integrated circuits; off-the-shelf semiconductors such as logic chips, transistors, or other discrete devices; and/or other mechanical or electrical devices. A component may also be implemented in programmable hardware devices such as field programmable gate arrays, programmable array logic, programmable logic devices, or the like. A component may comprise one or more silicon integrated circuit devices (e.g., chips, die, die planes, packages) or other discrete electrical devices, in electrical communication with one or more other components through electrical lines of a printed circuit board (PCB) or the like. Each of the functions and/or modules described herein, in certain embodiments, may alternatively be embodied by or implemented as a component.

A circuit, as used herein, comprises a set of one or more electrical and/or electronic components providing one or more pathways for electrical current. In certain embodiments, a circuit may include a return pathway for electrical current, so that the circuit is a closed loop. In another embodiment, however, a set of components that does not include a return pathway for electrical current may be referred to as a circuit (e.g., an open loop). For example, an integrated circuit may be referred to as a circuit regardless of whether the integrated circuit is coupled to ground (as a return pathway for electrical current) or not. In various embodiments, a circuit may include a portion of an integrated circuit, an integrated circuit, a set of integrated circuits, a set of non-integrated electrical and/or electrical components with or without integrated circuit devices, or the like. In one embodiment, a circuit may include custom VLSI circuits, gate arrays, logic circuits, or other integrated circuits; off-the-shelf semiconductors such as logic chips, transistors, or other discrete devices; and/or other mechanical or electrical devices. A circuit may also be implemented as a synthesized circuit in a programmable hardware device such as field programmable gate array, programmable array logic, programmable logic device, or the like (e.g., as firmware, a netlist, or the like). A circuit may comprise one or more silicon integrated circuit devices (e.g., chips, die, die planes, packages) or other discrete electrical devices, in electrical communication with one or more other components through electrical lines of a printed circuit board (PCB) or the like. Each of the functions and/or modules described herein, in certain embodiments, may be embodied by or implemented as a circuit.

Reference throughout this specification to "one embodiment," "an embodiment," or similar language means that a particular feature, structure, or characteristic described in connection with the embodiment is included in at least one embodiment of the present disclosure. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Further, as used herein, reference to reading, writing, loading, storing, buffering, and/or transferring data can include the entirety of the data, a portion of the data, a set of the data, and/or a subset of the data. Likewise, reference to reading, writing, loading, storing, buffering, and/or transferring non-host data can include the entirety of the non-host data, a portion of the non-host data, a set of the non-host data, and/or a subset of the non-host data.

Lastly, the terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C" An exception to this definition will occur only when a combination of elements, functions, steps, or acts are in some way inherently mutually exclusive.

Aspects of the present disclosure are described below with reference to schematic flowchart diagrams and/or schematic block diagrams of methods, apparatuses, systems, and computer program products according to embodiments of the disclosure. It will be understood that each block of the schematic flowchart diagrams and/or schematic block diagrams, and combinations of blocks in the schematic flowchart diagrams and/or schematic block diagrams, can be implemented by computer program instructions. These computer program instructions may be provided to a processor of a computer or other programmable data processing apparatus to produce a machine, such that the instructions, which execute via the processor or other programmable data processing apparatus, create means for implementing the functions and/or acts specified in the schematic flowchart diagrams and/or schematic block diagrams block or blocks.

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated figures. Although various arrow types and line types may be employed in the flowchart and/or block diagrams, they are understood not to limit the scope of the corresponding embodiments. For instance, an arrow may indicate a waiting or monitoring period of unspecified duration between enumerated steps of the depicted embodiment.

In the following detailed description, reference is made to the accompanying drawings, which form a part thereof. The foregoing summary is illustrative only and is not intended to be in any way limiting. In addition to the illustrative aspects, embodiments, and features described above, further aspects, embodiments, and features will become apparent by reference to the drawings and the following detailed description. The description of elements in each figure may refer to elements of proceeding figures. Like numbers may refer to like elements in the figures, including alternate embodiments of like elements.

Referring to FIG. 1, a schematic block diagram of a system in accordance with an embodiment of the disclosure is shown. The system 100 comprises one or more storage devices 120 of a storage system 102 within a host-computing device 110 in communication via a controller 126. The host-computing device 110 may include a processor 111, volatile memory 112, and a communication interface 113. The processor 111 may include one or more central processing units, one or more general-purpose processors, one or more application-specific processors, one or more virtual processors (e.g., the host-computing device 110 may be a virtual machine operating within a host), one or more processor cores, or the like. In some embodiments, a service processor (not shown) may be present. (A service processor is a microcontroller that typically monitors the physical environment of host-computing device 110 and controls things like power supplies, fans, etc.) The communication interface 113 may include one or more network interfaces configured to communicatively couple the host-computing device 110 and/or controller 126 of the storage device 120 to a communication network such as an Internet Protocol (IP) network, a Storage Area Network (SAN), wireless network, wired network, or the like.

The storage device 120, in various embodiments, may be disposed in one or more different locations relative to the host-computing device 110. In one embodiment, the storage device 120 comprises one or more non-volatile memory devices 123, such as semiconductor chips or packages or other integrated circuit devices disposed on one or more printed circuit boards, storage housings, and/or other mechanical and/or electrical support structures. For example, the storage device 120 may comprise one or more dual inline memory module (DIMM) cards, one or more expansion cards and/or daughter cards, a solid-state-drive (SSD) or other hard drive device, and/or may have another memory and/or storage form factor. The storage device 120 may be integrated with and/or mounted on a motherboard of the host-computing device 110, installed in a port and/or slot of the host-computing device 110, installed on a different host-computing device 110 and/or a dedicated storage appliance on the network 115, in communication with the host-computing device 110 over an external bus (e.g., an external hard drive), or the like.

The storage device 120, in some embodiments, may be disposed on a memory bus of a processor 111 (e.g., on the same memory bus as the volatile memory 112, on a different memory bus from the volatile memory 112, in place of the volatile memory 112, or the like). In a further embodiment, the storage device 120 may be disposed on a peripheral bus of the host-computing device 110, such as a peripheral component interconnect express (PCI Express or PCIe) bus such, as but not limited to a NVM Express (NVMe) interface, a Serial Advanced Technology Attachment (SATA) bus, a Parallel Advanced Technology Attachment (PATA) bus, a Small Computer System Interface (SCSI) bus, a Serially Attached SCSI (SAS) bus, a FireWire bus, a Fibre Channel connection, a Universal Serial Bus (USB), a PCIe Advanced Switching (PCIe-AS) bus, or the like. In another embodiment, the storage device 120 may be disposed on a communication network 115, such as an Ethernet network, an InfiniBand network, SCSI RDMA over a network 115, a storage area network (SAN), a local area network (LAN), a wide area network (WAN) such as the Internet, another wired and/or wireless network 115, or the like.

The host-computing device 110 may further comprise computer-readable storage medium 114. The computer-readable storage medium 114 may comprise executable instructions configured to cause the host-computing device 110 (e.g., processor 111) to perform steps of one or more of the methods disclosed herein.

A device driver and/or the controller 126, in certain embodiments, may present a logical address space 134 to the host clients 116. As used herein, a logical address space 134 refers to a logical representation of memory resources. The logical address space 134 may comprise a plurality (e.g., range) of logical addresses. As used herein, a logical address refers to any identifier for referencing a memory resource (e.g., data), including, but not limited to a logical block address (LBA), cylinder/head/sector (CHS) address, a file name, an object identifier, an inode, a Universally Unique Identifier (UUID), a Globally Unique Identifier (GUID), a hash code, a signature, an index entry, a range, an extent, or the like.

A device driver for the storage device 120 may maintain metadata 135, such as a logical to physical address mapping structure, to map logical addresses of the logical address space 134 to media storage locations on the storage device(s) 120. The device driver may be configured to provide storage services to one or more host clients 116. The host clients 116 may include local clients operating on the host-computing device 110 and/or remote clients 117 accessible via the network 115 and/or communication interface 113. The host clients 116 may include, but are not limited to: operating systems, file systems, database applications, server applications, kernel-level processes, user-level processes, applications, and the like.

In many embodiments, the host-computing device 110 can include a plurality of virtual machines which may be instantiated or otherwise created based on user-request. As will be understood by those skilled in the art, a host-computing device 110 may create a plurality of virtual machines configured as virtual hosts which is limited only on the available computing resources and/or demand. A hypervisor may be available to create, run, and otherwise manage the plurality of virtual machines. Each virtual machine may include a plurality of virtual host clients similar to host clients 116 that may utilize the storage system 102 to store and access data.

The device driver may be further communicatively coupled to one or more storage systems 102 which may include different types and configurations of storage devices 120 including, but not limited to: solid-state storage devices (e.g., SSDs), semiconductor storage devices, SAN storage resources, or the like. The one or more storage devices 120 may comprise one or more respective controllers 126 and non-volatile memory channels 122. The device driver may provide access to the one or more storage devices 120 via any compatible protocols or interface 133 such as, but not limited to, SAS, SATA, and PCIe. The metadata 135 may be used to manage and/or track data operations performed through the protocols or interfaces 133. The logical address space 134 may comprise a plurality of logical addresses, each corresponding to respective media locations of the one or more storage devices 120. The device driver may maintain metadata 135 comprising any-to-any mappings between logical addresses and media locations.

A device driver may further comprise and/or be in communication with a storage device interface 139 configured to transfer data, commands, and/or queries to the one or more storage devices 120 over a bus 125, which may include, but is not limited to: a memory bus of a processor 111, a peripheral component interconnect express (PCI Express or PCIe) bus, a Serial Advanced Technology Attachment (SATA) bus, a parallel ATA bus, a Small Computer System Interface (SCSI) bus, a Serially Attached SCSI (SAS) bus, FireWire, Fibre Channel, a Universal Serial Bus (USB), a PCIe Advanced Switching (PCIe-AS) bus, a network 115, InfiniBand, SCSI RDMA, Non-Volatile Memory Express (NVMe), or the like. The storage device interface 139 may communicate with the one or more storage devices 120 using input-output control (IO-CTL) command(s), IO-CTL command extension(s), remote direct memory access, or the like.

The communication interface 113 may comprise one or more network interfaces configured to communicatively couple the host-computing device 110 and/or the controller 126 to a network 115 and/or to one or more remote clients 117 (which can function as another host). The controller 126 is part of and/or in communication with one or more storage devices 120. Although FIG. 1 depicts a single storage device 120, the disclosure is not limited in this regard and could be adapted to incorporate any number of storage devices 120.

The storage device 120 may comprise one or more non-volatile memory devices 123 of non-volatile memory channels 122, which may include but is not limited to: ReRAM, Memristor memory, programmable metallization cell memory, phase-change memory (PCM, PCME, PRAM, PCRAM, ovonic unified memory, chalcogenide RAM, or C-RAM), NAME) flash memory (e.g., 2D NAND flash memory, 3D NAND flash memory), NOR flash memory, nano random access memory (nano RAM or NRAM), nanocrystal-wire-based memory, silicon-oxide based sub-10-nanometer process memory, graphene memory, Silicon-Oxide-Nitride-Oxide-Silicon (SONOS), programmable metallization cell (PMC), conductive-bridging RAM (CBRAM), magneto-resistive RAM (MRAM), magnetic storage media (e.g., hard disk, tape), optical storage media, or the like. The one or more non-volatile memory devices 123 of the non-volatile memory channels 122, in certain embodiments, may comprise storage class memory (SCM) (e.g., write in place memory, or the like).

The non-volatile memory channels 122 may more generally comprise one or more non-volatile recording media capable of recording data, which may be referred to as a non-volatile memory medium, a non-volatile memory device, a persistent memory device, or the like. Further, the storage device 120, in various embodiments, may comprise a non-volatile recording device, a non-volatile memory array 129, a plurality of interconnected storage devices in an array, or the like.

The non-volatile memory channels 122 may comprise one or more non-volatile memory devices 123, which may include, but are not limited to chips, packages, planes, die, or the like. A controller 126 may be configured to manage data operations on the non-volatile memory channels 122 and may comprise one or more processors, programmable processors (e.g., FPGAs), ASICS, microcontrollers, accelerators, emulators, or the like. In some embodiments, the controller 126 is configured to store data on and/or read data from the non-volatile memory channels 122, to transfer data to/from the storage device 120, and so on.

The controller 126 may be communicatively coupled to the non-volatile memory channels 122 by way of a bus 127. The bus 127 may comprise an FO bus for communicating data to/from the non-volatile memory devices 123. The bus 127 may further comprise a control bus for communicating addressing and other command and control information to the non-volatile memory devices 123. In some embodiments, the bus 127 may communicatively couple the non-volatile memory devices 123 to the controller 126 in parallel. This parallel access may allow the non-volatile memory devices 123 to be managed as a group, forming a non-volatile memory array 129. The non-volatile memory devices 123 may be partitioned into respective logical memory units (e.g., logical pages) and/or logical memory divisions (e.g., logical blocks). The logical memory units may be formed by logically combining physical memory units of each of the non-volatile memory devices 123.

The controller 126 may organize a block of word lines within a non-volatile memory device 123, in certain embodiments, using addresses of the word lines, such that the word lines are logically organized into a monotonically increasing sequence (e.g., decoding and/or translating addresses for word lines into a monotonically increasing sequence, or the like). In a further embodiment, word lines of a block within a non-volatile memory device 123 may be physically arranged in a monotonically increasing sequence of word line addresses, with consecutively addressed word lines also being physically adjacent (e.g., WL0, WL1, WL2, . . . WLN).

The controller 126 may comprise and/or be in communication with a device driver executing on the host-computing device 110. A device driver may provide storage services to the host clients 116 via one or more interfaces 133. A device driver may further comprise a storage device interface 139 that is configured to transfer data, commands, and/or queries to the controller 126 over a bus 125, as described above.

Figure 2:
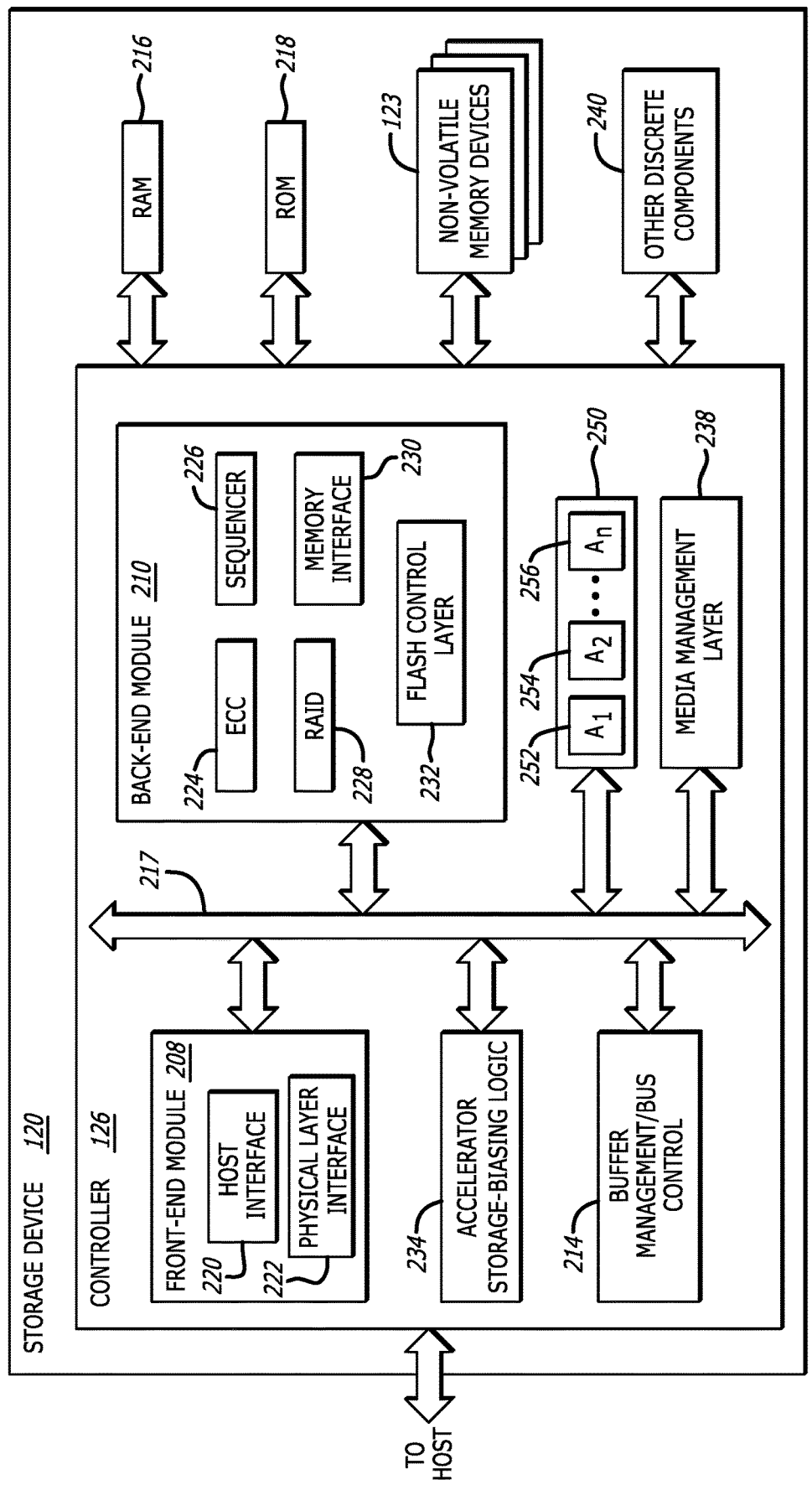
FIG. 2 is a schematic block diagram of a storage device in accordance with an embodiment of the disclosure.

Referring to FIG. 2, a schematic block diagram of a storage device in accordance with an embodiment of the disclosure is shown. The controller 126 may include a FEM 208 that interfaces with a host via a plurality of high priority and low priority communication channels, a Back-End Module (BEM) 210 that interfaces with the non-volatile memory devices 123, and various other modules that perform various functions of the storage device 120. In some embodiments, each module may just be the portion of the memory that comprises instructions executable with the processor to implement the features of the corresponding module without the module including any other hardware. Because each module includes at least some hardware even when the included hardware comprises software, each module may be interchangeably referred to as a hardware module.

The controller 126 may include a Buffer Management/Bus Control Module (BMBC) 214 that manages buffers in Random Access Memory (RAM) 216 and controls the internal bus arbitration for communication on an internal communications bus 217 of the controller 126. A read only memory (ROM) 218 may store and/or access system boot code. Although illustrated in FIG. 2 as located separately from the controller 126, in other embodiments one or both of the RAM 216 and the ROM 218 may be located within the controller 126. In yet other embodiments, portions of RAM 216 and ROM 218 may be located both within the controller 126 and outside the controller 126. Further, in some implementations, the controller 126, the RAM 216, and the ROM 218 may be located on separate semiconductor dies.

Additionally, the FEM 208 may include a host interface 220 and a physical layer interface 222 that provides the electrical interface with the host or next-level storage controller. The choice of the type of the host interface 220 can depend on the type of memory being used. Embodiment types of the host interfaces 220 may include, but are not limited to, SATA, SATA Express, SAS, Fibre Channel, USB, PCIe, and NVMe. The host interface 220 may typically facilitate transfer for data, control signals, and timing signals.

The BEM 210 may include an error correction code (ECC) engine 224 that encodes the data bytes received from the host and decodes and error corrects the data bytes read from the nonvolatile memory devices 123. The BEM 210 may also include a command sequencer 226 that generates command sequences, such as program, read, and erase command sequences, to be transmitted to the non-volatile memory devices 123. Additionally, the BEM 210 may include a RAID (Redundant Array of Independent Drives) module 228 that manages the generation of RAID parity and recovery of failed data. The RAID parity may be used as an additional level of integrity protection for the data being written into the storage device 120. In some embodiments, the RAID module 228 may be a part of the ECC engine 224. A memory interface 230 provides the command sequences to the non-volatile memory devices 123 and receives status information from the non-volatile memory devices 123. Along with the command sequences and status information, data to be programmed into and read from the non-volatile memory devices 123 may be communicated through the memory interface 230. A flash control layer 232 may control the overall operation of BEM 210.

Additional modules of the storage device 120 illustrated in FIG. 2 may include a Media Management Layer (MML) 238, which performs wear leveling of memory cells of the non-volatile memory devices 123. The storage device 120 may also include other discrete components 240, such as external electrical interfaces, external RAM, resistors, capacitors, or other components that may interface with controller 126. In alternative embodiments, one or more of the RAID modules 228, MML 238, and BMBC 214 are optional components that may not be necessary in the controller 126.

In various embodiments, controller 126 may comprise a group of one or more accelerators 250, while in various other embodiments, the one or more accelerators 250 may be external to controller 126 or elsewhere in system 100. The individual accelerators Ai 252, A2 254, and $A_n$ 256 may be used for efficiently performing operations and manipulations on data from one or more applications and may directly access non-volatile memory devices 123 bypassing the various components of controller 126, including any processors controlling features such as the FEM 208, the BEM 210, etc. Accelerator Storage-Biasing Logic (ASBL) 234 assigns, deassigns, and otherwise manages the portions of non-volatile memory devices 123 that are allocated to each accelerator 250. Persons skilled in the art will realize that the number of accelerators may vary from embodiment to embodiment, and the accelerators Ai 252, A2 254, and $A_n$ 256 are exemplary only.

Figure 3:
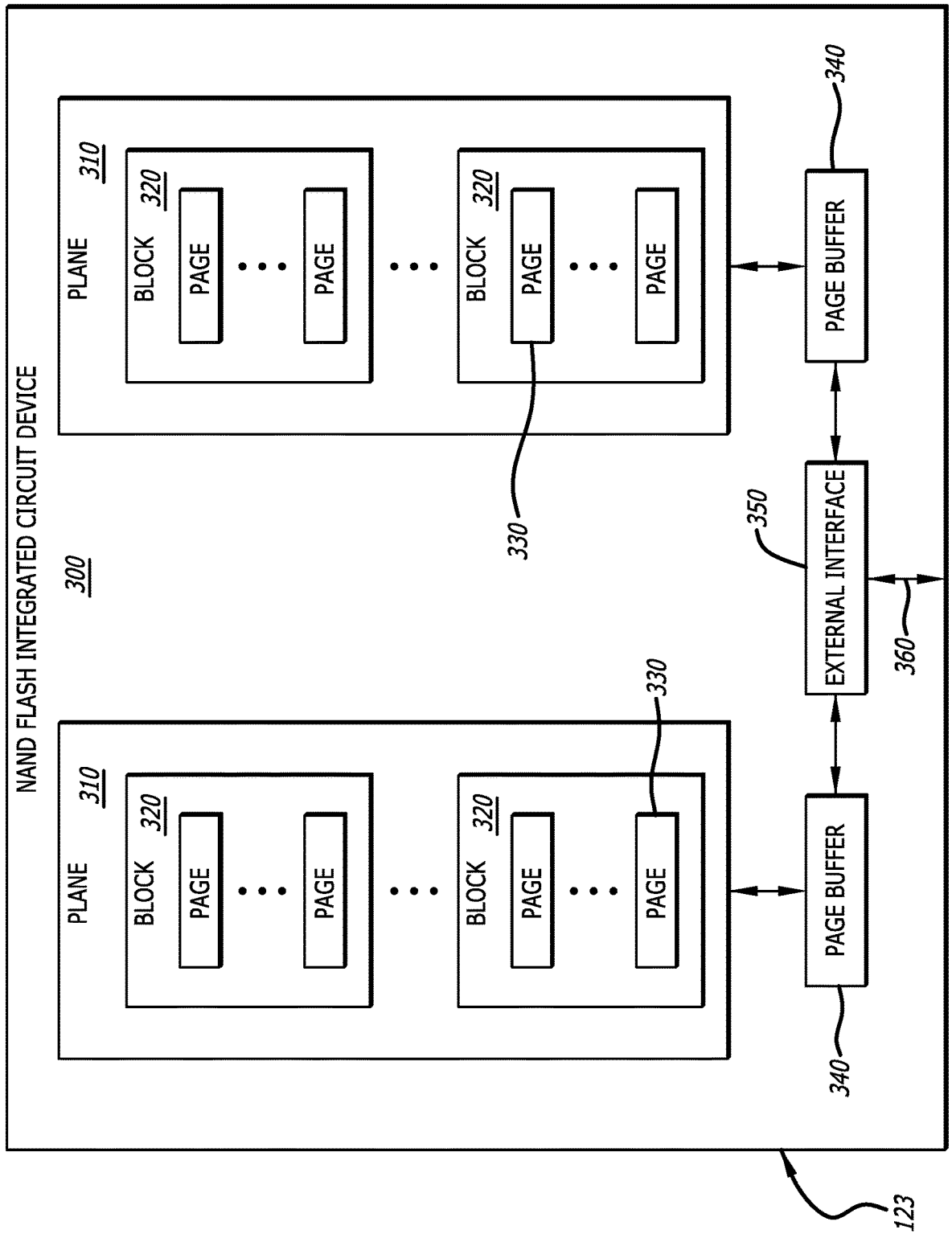
FIG. 3 is a schematic block diagram of a NAND flash integrated circuit device in accordance with an embodiment of the disclosure.

Referring to FIG. 3, a schematic block diagram of a NAND flash integrated circuit device in accordance with an embodiment of the disclosure is shown. NAND flash integrated circuit device 300 may be an example of the sort of non-volatile memory device 123 that is typically utilized in a product like storage device 120. NAND flash integrated circuit device 300 may comprise one or more planes 310. Each plane 310 may comprise a plurality of blocks 320. Each block 320 may comprise a plurality of pages 330. Each plane may have one or more associated page buffers 340.

A page 330 may be the smallest division of the memory that can be programmed (e.g., persistently written) or read at one time. An entire page may be assembled for programming or reading at one time in a page buffer 340 associated with the plane of that page. Typically, an entire page buffer may be read from the NAND flash integrated circuit device 300 at one time through external interface 350 and external bus 360. Similarly, an entire page of data that is to be written into page buffer 340 to be programmed in the NAND flash integrated circuit device 300 through external interface 350 and external bus 360.

A block 320 is the smallest memory division that may be erased at one time. Once written, a page 330 may not be overwritten until its entire block 320 has been erased. Erasing a block 320 may completely destroy the data in all of its pages 330 by persistently writing a logic-1 to all the bits in all the pages 330 in block 320. A program operation may persistently write a logic-0 in every bit in a page that needs to be a logic-0 while leaving erased bits that need to be a logic-1 unaltered.

A plane 310 may be the smallest memory division able to perform an operation independently of the other planes. Thus, for example, a first plane 310 may be performing a program operation from its page buffer 340 to one of its pages 330, while a second plane 310 may be simultaneously reading one of its pages 330 into its page buffer 340. Adjudication for sharing the resources of external interface 350 and external bus 360 may be controlled either on-chip or in the external storage device 120.

Figure 4A:
FIG. 4A is a schematic block diagram of a portion of a non-volatile memory array in accordance with an embodiment of the disclosure.

Referring to FIG. 4A, a schematic block diagram of a portion of a non-volatile memory array in accordance with an embodiment of the disclosure is shown. Exemplary non-volatile memory array 129 may comprise two portions of a plurality of non-volatile memory devices 123. In the figure, each portion is associated with one of two memory channels 122A and 122B. In some embodiments, there may be only one non-volatile memory channel 122, while in other embodiments, there may be more than two. In various embodiments, each of the portions of the non-volatile memory devices 123 may be hardwired to its respective memory channel 122A or 122B, while in various other embodiments, the non-volatile memory channels 122 are programmably assigned and/or reassigned as needed to different portions of non-volatile memory array 129. While eight non-volatile memory devices 123 are shown associated with memory channel 122A and an additional eight non-volatile memory devices 123 are shown associated with memory channel 122B, any number may be used as a matter of design choice. Non-volatile memory devices 123 are illustrated as having a single plane in the figure, but devices with other numbers of planes may be used.

Exemplary accelerator memory group 410 may comprise eight non-volatile memory devices 123 and may be associated with memory channel 122A. Similarly, exemplary accelerator memory groups 420 and 430 may comprise four and two non-volatile memory devices 123 respectively, and both may be affiliated with memory channel 122B. Each of these accelerator memory groups 410, 420, and 430 may be associated with a particular accelerator 250 in controller 126 or elsewhere in storage device 120. In certain embodiments, the accelerator may be elsewhere in host-computing device 110 or elsewhere in system 100.

Each of the accelerator memory groups 410, 420, and 430 may be assigned to a respective accelerator 250 by ASBL 234. Storage biasing may be a method for efficiently allocating resources in non-volatile memory array 129 to meet the computational needs of accelerators performing direct access to the non-volatile memory array 129 by means of memory channels 122 and bypassing any other processor present in controller 126 or elsewhere in storage device 120.

An important metric for an accelerator 250 directly accessing non-volatile memory array 129 may be throughput. Several potential bottlenecks may be present in any given embodiment. For example, the type of data being processed, the data word size and/or operating frequency of the accelerator, the number and/or speed of the memory channels, the access time and/or the data word width of the non-volatile memory devices 123, etc., may play a part in determining the overall throughput of the non-volatile memory device 123.

The ASBL 234 may determine the needed throughput for each accelerator 250 based upon the needs for the particular sorts of computations and/or data manipulations and/or the hardware resources available. ASBL 234 then may exclusively assign accelerator memory groups to the various accelerators 250 on an as-needed basis. For example, accelerator memory group 410 may be assigned to accelerator Ai 252, accelerator memory group 420 may be assigned to accelerator A2 254, and accelerator memory group 430 may be assigned to accelerator $A_n$ 256. If an accelerator 250 no longer needs its assigned accelerator memory group, then the ASBL 234 may return that portion of non-volatile memory array 129 for general usage by the storage device 120.

Exemplary accelerator memory group 410 may be assigned to accelerator Ai 252 and may be sized for high throughput. Exemplary accelerator memory group 410 may be segmented across eight non-volatile memory devices 123. Typically, the non-volatile memory devices 123 may be identical in storage device 120 and have the same data word width and same read, erase, and program times. By segmenting data across eight non-volatile memory devices 123, the nonvolatile memory array 129 throughput may be eight times greater than if only a single non-volatile memory device 123 was used. The speckled rectangles may indicate data currently resident in accelerator memory group 410 spanning many blocks and pages in the non-volatile memory devices 123. This may be indicative of a large amount of data that may be cached and/or accessed rapidly.

Exemplary accelerator memory group 420 may be assigned to accelerator A2 254 and may be sized for moderate throughput. Exemplary accelerator memory group 420 may be segmented across four non-volatile memory devices 123. By segmenting data across four nonvolatile memory devices 123, the non-volatile memory array 129 throughput may be four times greater than if only a single non-volatile memory device 123 was used. The speckled rectangles may indicate data currently resident in accelerator memory group 420 spanning a small number of pages in the non-volatile memory devices 123. This may be indicative of a modest amount of data that may be cached and/or accessed with moderate throughput.

Exemplary accelerator memory group 430 may be assigned to accelerator $A_n$ 256 and may be sized for lower throughput. Exemplary accelerator memory group 430 may be segmented across two non-volatile memory devices 123. By segmenting data across two non-volatile memory devices 123, the non-volatile memory array 129 throughput may be two times greater than if only a single non-volatile memory device 123 was used. The speckled rectangles may indicate data currently resident in accelerator memory group 420 spanning many pages in the non-volatile memory devices 123. This may be indicative of a moderate amount of data that may be cached and/or accessed with lower throughput.

Figure 4B:
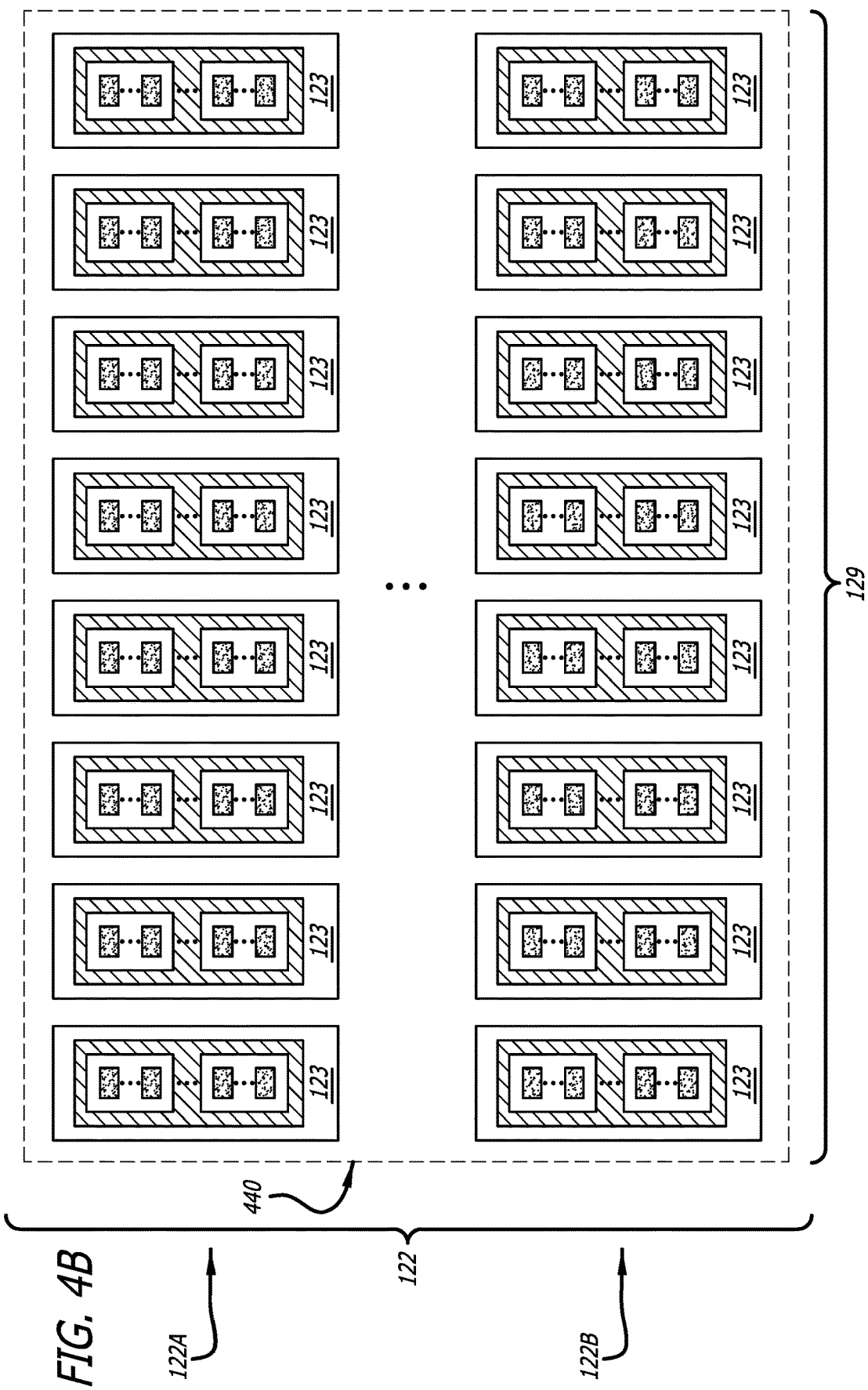
FIG. 4B is a schematic block diagram of a portion of a non-volatile memory array in accordance with an embodiment of the disclosure.

Referring to FIG. 4B, a schematic block diagram of a portion of a non-volatile memory array in accordance with an embodiment of the disclosure is shown. Exemplary non-volatile memory array 129 may comprise two portions of a plurality of non-volatile memory devices 123. In the figure, each portion is associated with one of two memory channels 122A and 122B. In some embodiments, there may be only one non-volatile memory channel 122, while in other embodiments, there may be more than two. In various embodiments, each of the portions of the non-volatile memory devices 123 may be hardwired to its respective memory channel 122A or 122B, while in various other embodiments, the non-volatile memory channels 122 are programmably assigned and/or reassigned as needed to different portions of non-volatile memory array 129.

Exemplary accelerator memory group 440 may comprise 16 non-volatile memory devices 123 and may be associated with both memory channel 122A and memory channel 122B. Accelerator memory group 440 may be associated with a particular accelerator $A_n$ 256 in controller 126 or elsewhere in storage device 120. In certain embodiments, the accelerator may be elsewhere in host-computing device 110 or elsewhere in system 100.

Accelerator memory group 440 may be assigned to accelerator $A_n$ 256 by ASBL 234. Storage biasing may be a method for efficiently allocating resources in non-volatile memory array 129 to meet the computational needs of accelerators performing direct access to the nonvolatile memory array 129 by means of memory channel 122A and memory channel 122B and bypassing any other processor present in controller 126 or elsewhere in storage device 120.

An important metric for accelerator $A_n$ 256 directly accessing non-volatile memory array 129 may be throughput. Several potential bottlenecks may be present in any given embodiment. For example, the type of data being processed, the data word size and/or operating frequency of the accelerator, the number and/or speed of the memory channels, the access time and/or the data word width of the non-volatile memory devices 123, etc., may play a part in determining the overall throughput of the non-volatile memory device 123.

The ASBL 234 may determine the needed throughput for accelerator $A_n$ 256 based upon the needs for the particular sorts of computations and/or data manipulations and/or the hardware resources available. ASBL 234 then may exclusively assign accelerator memory group 440 to accelerator $A_n$ 256 on an as-needed basis. If accelerator $A_n$ 256 no longer needs its assigned accelerator memory group, then the ASBL 234 may return that portion of non-volatile memory array 129 for general usage by the storage device 120.

Exemplary accelerator memory group 440 may be assigned to accelerator $A_n$ 256 and may be sized for very high throughput. Exemplary accelerator memory group 440 may be segmented across 16 non-volatile memory devices 123 and is assigned to two memory channels 122A and 122B. By segmenting data across 16 non-volatile memory devices 123 and two memory channels 122A and 122B, the non-volatile memory array 129 throughput may be 16 times greater than if only a single non-volatile memory device 123 was used. The speckled rectangles may indicate data currently resident in accelerator memory group 420 spanning many pages in the nonvolatile memory devices 123. This may be indicative of a very large amount of data that needs to be accessed with high throughput.

Figure 5:
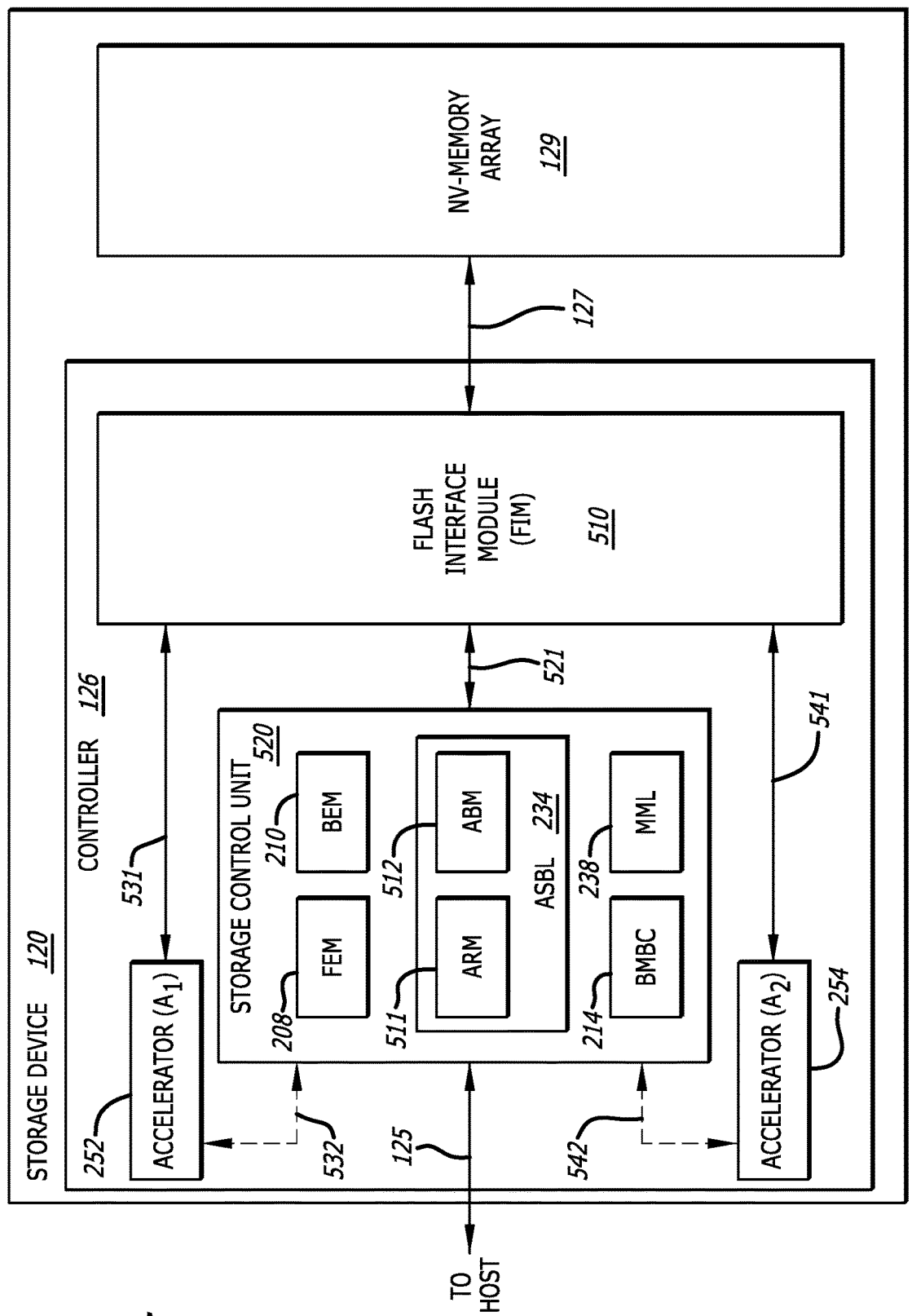
FIG. 5 is a schematic block diagram of a storage device in accordance with an embodiment of the disclosure.

Referring to FIG. 5, a schematic block diagram of a storage device in accordance with an embodiment of the disclosure is shown. Storage device 120 comprises bus 125, controller 126, bus 127, non-volatile memory array 129, accelerator Ai 252, and accelerator A2 254 as previously discussed in conjunction with FIG. 1 and FIG. 2 but with additional details illustrated. Controller 126 further comprises Flash Interface Module (FIM) 510 and Storage Control Unit (SCU) 520.

Bus 127 may carry one or more non-volatile memory channels 122 between FIM 510 and non-volatile memory array 129. FIM 510, in turn, may make the one or more non-volatile memory channels 122 (or portions thereof) available to SCU 520 over bus 521, accelerator Ai 252 over bus 531, and accelerator A2 254 over bus 541. Busses 531 and 541 bypass SCU 520 and any processors therein and allow the accelerators Ai 252 and A2 254 to directly access non-volatile memory array 129. The two accelerators Ai 252 and A2 254 may receive Logical-to-Physical (L2P) synchronization data from SCU 520 over busses 532 and 542, respectively. While two accelerators Ai 252 and A2 254 are shown in FIG. 5, theoretically, any number may be present as a matter of design choice.

External data may be transferred to and from host-computing device 110 by means of bus 125 and to non-volatile memory array 129 by means of SCU 520, bus 521, FIM 510, and bus 127. Once present in non-volatile memory array 129, data may be cached for use by accelerators Ai 252 and A2 254 via bus 127, FIM 510, and busses 531 and 541, respectively. From the perspective of host-computing device 110, storage device 120 may operate in the same manner as a prior generation storage device but with a higher throughput due to the operation of the accelerators 250.

Storage Control Unit (SCU) 520 may further comprise FEM 208, BEM 210, BMBC 214, ASBL 234, and MML 238 as discussed in conjunction with FIG. 2. ASBL 234 may further comprise Accelerator Resource Manager (ARM) 511 and Accelerator Block Manager (ABM) 512.

ARM 511 may operate at a high level determining the accelerator 250 usage of the non-volatile memory array 129. Much of non-volatile memory array 129 may be dedicated to the ordinary operation of storage device 120 and may be managed elsewhere in SCU 520. Some of non-volatile memory array 129 may be dedicated to caches for various functions, including any cache required by the accelerators 250. ARM 511 may coordinate this with the other modules in SCU 520.

ABM 512 may operate at a lower level determining the detailed usage of non-volatile memory devices 123 and their internal resources with respect to the other modules in SCU 520. In particular, host-computing device 110 may operate on logical blocks which are addressed in an orderly fashion with contiguous logical addresses. These addresses may be mapped in a different order in non-volatile memory devices 123 due, for example, to the presence of bad blocks that are physically defective and may not be used. SCU 520 may manage the logical-to-physical (L2P) mapping between logical blocks and physical blocks. Since accelerators Ai 252 and A2 254 may directly bypass SCU 520, they may need to access the L2P information. SCU 520 may provide this information to accelerators Ai 252 and A2 254 by means of busses 532 and 542, respectively, and ABM 512 may coordinate this process with other modules in SCU 520.

Figure 6:
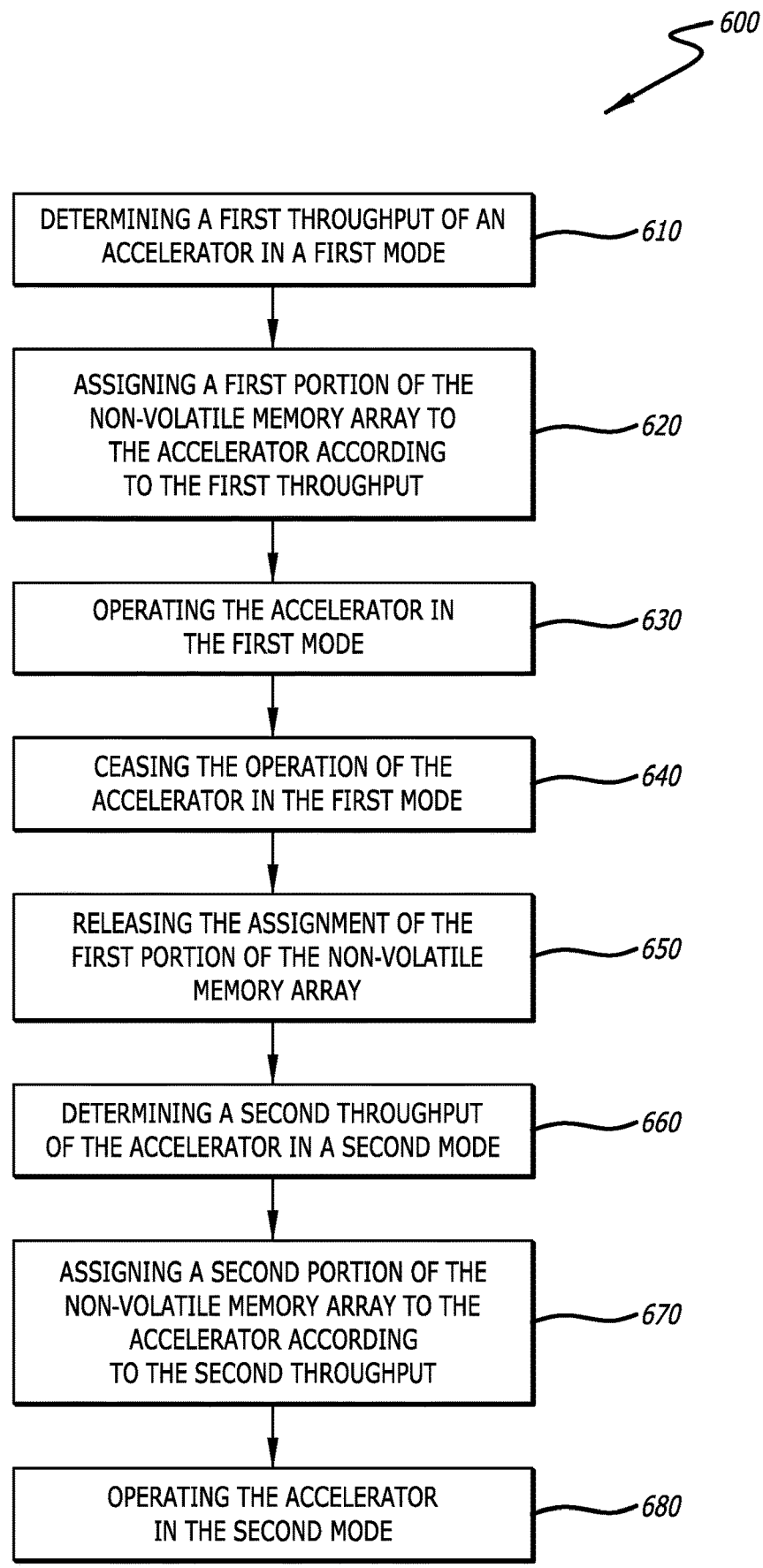
FIG. 6 is a flowchart depicting a process of operation of a storage device in accordance with an embodiment of the disclosure.

Referring to FIG. 6, a flowchart depicting a process 600 of operation of a storage device in accordance with an embodiment of the disclosure is shown. Process 600 may begin by determining a first throughput of an accelerator in a first mode (block 610). This may include determining the type and amount of data the accelerator may need to process, the data word width of the accelerator, the number of non-volatile memory devices that may be needed due to store that amount of data, the number of non-volatile memory devices required to segment the data to match the accelerator data word width (or some multiple of the accelerator data word width), and the data structure that may be required to accommodate these requirements.

A first portion of the non-volatile memory array may then be assigned to the accelerator to create a data structure according to the determined first throughput (block 620), and operation of the accelerator in the first mode may begin (block 630). After a time, the accelerator may cease operating in the first mode (block 640). This may occur, for example, due to the completion of a task, the need to operate the accelerator in a different mode of operation, or the like. The first portion of the non-volatile memory array may be released and used by the storage device for other purposes (block 650).

After a time, process 600 may determine a second throughput of the accelerator in a second mode (block 660). This may include determining the type and amount of data the accelerator may need to process, the data word width of the accelerator, the number of non-volatile memory devices that may be needed due to store that amount of data, the number of non-volatile memory devices required to segment the data to match the accelerator data word width (or some multiple of the accelerator data word width), and the data structure that may be required to accommodate these requirements.

A second portion of the non-volatile memory array may then be assigned to the accelerator to create a data structure according to the determined second throughput (block 670), and operation of the accelerator in the second mode may begin (block 680). It should be noted in some instances, the first mode and the second mode may be identical, and the first portion of the non-volatile memory array may have been released to improve the overall throughput of the storage device when it was no longer needed by the accelerator at that time. In such an instance, the second portion of the non-volatile memory array may be functionally equivalent to the first portion of the non-volatile memory array but may be assigned to different physical non-volatile memory devices depending on the availability at the time of the assignment of the second portion of the non-volatile memory array.

Figure 7:
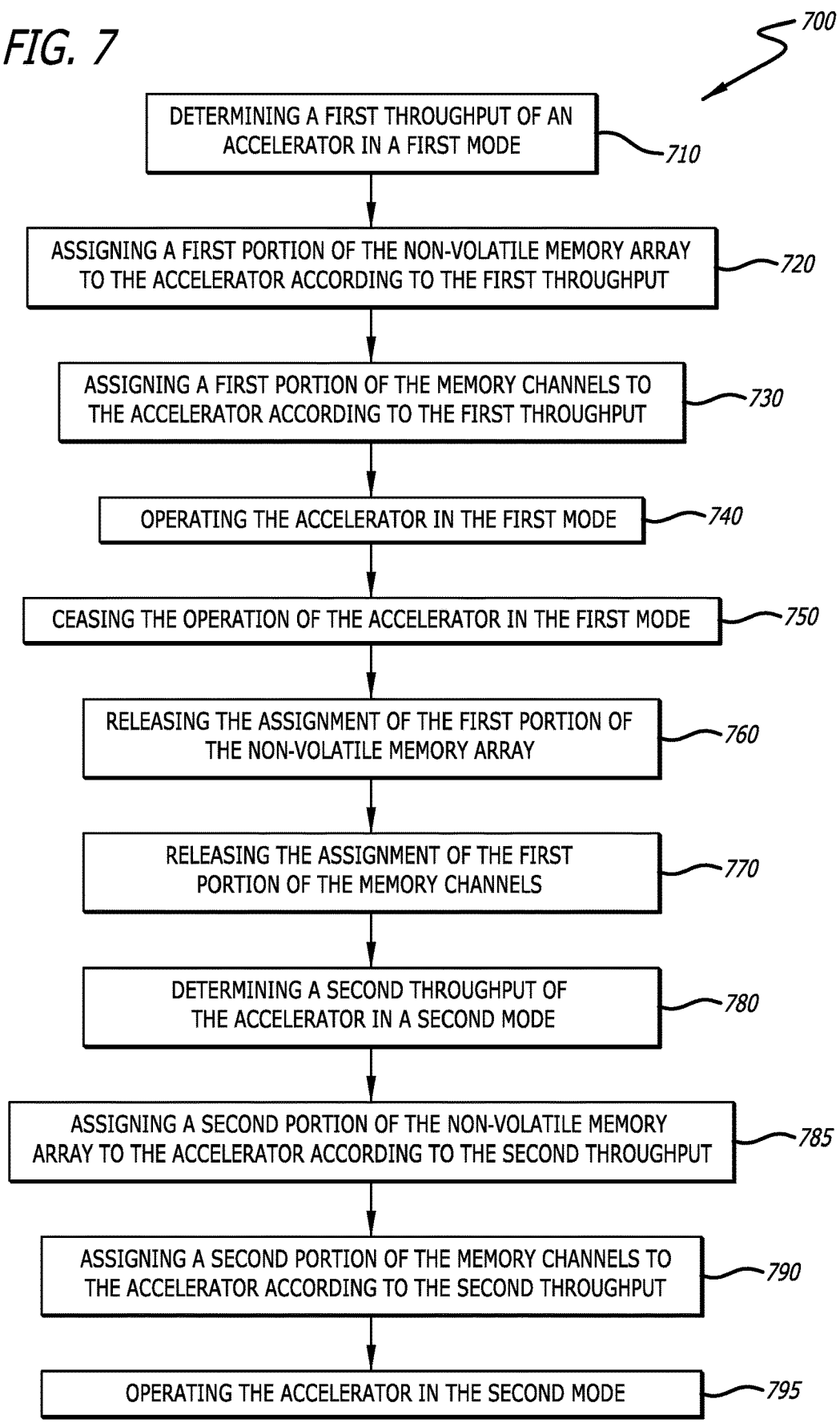
FIG. 7 is a flowchart depicting a process of operation of a storage device in accordance with an embodiment of the disclosure; and Corresponding reference characters indicate corresponding components throughout the several figures of the drawings. Elements in the several figures are illustrated for simplicity and clarity and have not necessarily been drawn to scale. For example, the dimensions of some of the elements in the figures might be emphasized relative to other elements for facilitating understanding of the various presently disclosed embodiments. In addition, common but well-understood elements that are useful or necessary in a commercially feasible embodiment are often not depicted in order to facilitate a less obstructed view of these various embodiments of the present disclosure.

Referring to FIG. 7, a flowchart depicting a process 700 of operation of a storage device in accordance with an embodiment of the disclosure is shown. Process 700 may begin by determining a first throughput of an accelerator in a first mode (block 710). This may include determining the type and amount of data the accelerator may need to process, the data word width of the accelerator, the number of non-volatile memory devices that may be needed due to store that amount of data, the number of non-volatile memory devices required to segment the data to match the accelerator data word width (or some multiple of the accelerator data word width), the number of memory channels required, and the data structure that may be required to accommodate these requirements.

A first portion of the non-volatile memory array may then be assigned to the accelerator to create a data structure according to the determined first throughput (block 720). A first portion of the memory channels may then be assigned to the accelerator according to the determined first throughput (block 730), and operation of the accelerator in the first mode may begin (block 740). After a time, the accelerator may cease operating in the first mode (block 750). This may occur, for example, due to the completion of a task, the need to operate the accelerator in a different mode of operation, or the like. The first portion of the non-volatile memory array may be released and used by the storage device for other purposes (block 760), and the first portion of the memory channels may be released and used by the storage device for other purposes (block 770).

After a time, process 700 may determine a second throughput of the accelerator in a second mode (block 780). This may include determining the type and amount of data the accelerator may need to process, the data word width of the accelerator, the number of non-volatile memory devices that may be needed due to store that amount of data, the number of non-volatile memory devices required to segment the data to match the accelerator data word width (or some multiple of the accelerator data word width), the number of memory channels required, and the data structure that may be required to accommodate these requirements.

A second portion of the non-volatile memory array may then be assigned to the accelerator to create a data structure according to the determined second throughput (block 785). A second portion of the memory channels may then be assigned to the accelerator according to the determined second throughput (block 790), and the operation of the accelerator in the second mode may begin (block 795). It should be noted in some instances the first mode and the second mode may be identical, and the first portion of the non-volatile memory array and the first portion of the memory channels may have been released to improve the overall throughput of the storage device when it was no longer needed by the accelerator at that time. In such an instance, the second portion of the non-volatile memory array may be functionally equivalent to the first portion of the non-volatile memory array but may be assigned to different physical non-volatile memory devices depending on the availability at the time of the assignment of the second portion of the non-volatile memory array. Similarly, the second portion of the memory channels may be functionally equivalent to the first portion of the memory channels but may be assigned to different physical memory channels depending on the availability at the time of the assignment of the second portion of the memory channels.

Information as herein shown and described in detail is fully capable of attaining the above-described object of the present disclosure, the presently preferred embodiment of the present disclosure, and is, thus, representative of the subject matter that is broadly contemplated by the present disclosure. The scope of the present disclosure fully encompasses other embodiments that might become obvious to those skilled in the art, and is to be limited, accordingly, by nothing other than the appended claims. Any reference to an element being made in the singular is not intended to mean "one and only one" unless explicitly so stated, but rather "one or more." All structural and functional equivalents to the elements of the above-described preferred embodiment and additional embodiments as regarded by those of ordinary skill in the art are hereby expressly incorporated by reference and are intended to be encompassed by the present claims.

Moreover, no requirement exists for a system or method to address each and every problem sought to be resolved by the present disclosure or for solutions to such problems to be encompassed by the present claims. Furthermore, no element, component, or method step in the present disclosure is intended to be dedicated to the public regardless of whether the element, component, or method step is explicitly recited in the claims. Various changes and modifications in form, material, work-piece, and fabrication material detail can be made, without departing from the spirit and scope of the present disclosure, as set forth in the appended claims, as might be apparent to those of ordinary skill in the art, are also encompassed by the present disclosure.

What is claimed is:

1. A device, comprising:
   a processor;
   a memory comprising a plurality of non-volatile NAND flash memory devices configured into a plurality of blocks;
   a first accelerator
   comprising a throughput and configured to directly access the memory bypassing the processor;
   the processor configured to assigns a portion of the memory as a data structure to the first accelerator based on a throughput of the first accelerator;
   the first accelerator operating upon data words of a first width in a first mode and operating upon data words of a second width in a second mode;
   the second width greater than the first width;
   the processor assigning a data structure to the first accelerator in the first mode, wherein:
      the data structure is distributed over a first portion of the plurality of non-volatile memory devices;
      the processor assigning a data structure to the first accelerator in the second mode, wherein the data structure is distributed over a second portion of the plurality of non-volatile memory devices; and
      wherein the second portion is greater than the first portion.

2. The device of claim 1, wherein the data structure is interleaved.

3. The device of claim 2, wherein the data structure is interleaved to a particular degree determined by the processor.

4. The device of claim 3, wherein the degree of interleaving is based on the first accelerator throughput.

5. The device of claim 3, wherein:
   the data structure comprises a portion of the plurality of memory blocks, and
   the portion of the plurality of memory blocks is distributed over a plurality of the non-volatile memory devices.

6. The device of claim 3, wherein:
   the first accelerator operates upon data words of a particular width, and
   the data structure is distributed over at least a portion of the plurality of non-volatile memory devices according to the width of the data words.

7. The device of claim 3, further comprising at least one memory channel, wherein the processor assigns a portion of the memory channels to the first accelerator according to the first throughput.

8. The device of claim 1, further comprising a second accelerator, wherein the second accelerator directly accesses the memory bypassing the processor.

9. The device of claim 8, wherein:
the first accelerator has a first throughput,
the second accelerator has a second throughput,
the processor assigns a first data structure to the first accelerator according to the first accelerator throughput, and
the processor assigns a second data structure to the second accelerator according to the second accelerator throughput.

10. The device of claim 8, wherein:
the first accelerator operates upon data words of a first width,
the second accelerator operates upon data words of a second width,
the processor assigns a first data structure to the first accelerator, wherein:
the first data structure is distributed over a first portion of the plurality of non-volatile memory devices, and
the processor assigns a second data structure to the second accelerator, wherein:
the second data structure is distributed over a second portion of the plurality of non-volatile memory devices.

11. The device of claim 9, further comprising a plurality of memory channels, wherein:
the processor assigns a first portion of the memory channels to the first accelerator according to the first throughput, and
the processor assigns a second portion of the memory channels to the second accelerator according to the second throughput.

12. The device of claim 9, further comprising at least one memory channel, wherein the first accelerator and the second accelerator share at least one memory channel.

13. A method of operating a device, the device comprising a processor, a non-volatile memory array, and an accelerator, wherein the accelerator is coupled to the non-volatile memory array bypassing the processor, the method comprising:
determining a first throughput of the accelerator in a first mode;
assigning a first portion of the non-volatile memory array to the accelerator according to the first throughput;
assigning a portion of the non-volatile memory array as a data structure to the first accelerator based on the throughput of the first accelerator;
operating upon data words of a first width in a first mode, and data words of a second width in a second mode using the first accelerator, wherein the second width is greater than the first width;
assigning a data structure to the first accelerator in the first mode, wherein the data structure is distributed over a first portion of the of non-volatile memory array;
assigning a data structure to the first accelerator in the second mode, wherein the data structure is distributed over a second portion of the plurality of non-volatile memory devices; and
wherein the second portion is greater than the first portion.

14. The method of claim 13, further comprising:
ceasing the operation of the accelerator in the first mode;
releasing the assignment of the first portion of the non-volatile memory array;
determining a second throughput of the accelerator in a second mode;
assigning a second portion of the non-volatile memory array to the accelerator according to the second throughput, wherein the second portion of the non-volatile memory array is segmented; and
operating the accelerator in the second mode.

15. The method of claim 14, wherein the first portion of the non-volatile memory array is segmented; and the second portion of the non-volatile memory array is segmented.

* * * * *